D. SEINIGER.
OIL BURNING HEATER.
APPLICATION FILED OCT. 8, 1919.

1,349,475.

Patented Aug. 10, 1920.
2 SHEETS—SHEET 1.

WITNESSES
Oliver W. Holmes
J. L. McAuliffe

INVENTOR
DAVID SEINIGER
BY
ATTORNEYS

D. SEINIGER.
OIL BURNING HEATER.
APPLICATION FILED OCT. 8, 1919.

1,349,475.

Patented Aug. 10, 1920.
2 SHEETS—SHEET 2.

WITNESSES

INVENTOR
DAVID SEINIGER
BY
ATTORNEYS

UNITED STATES PATENT OFFICE.

DAVID SEINIGER, OF MIDDLETOWN, NEW YORK.

OIL-BURNING HEATER.

1,349,475.  Specification of Letters Patent.  Patented Aug. 10, 1920.

Application filed October 8, 1919. Serial No. 329,310.

*To all whom it may concern:*

Be it known that I, DAVID SEINIGER, a citizen of the United States, and a resident of Middletown, in the county of Orange and State of New York, have invented a new and Improved Oil-Burning Heater, of which the following is a description.

My invention relates to a heating burner adapted to burn liquid fuel and is more particularly designed as a kerosene burner. In the vaporizing and burning of liquid fuel, particularly kerosene, the fuel has a very pronounced tendency to condense after vaporization, and an object of my invention is to provide a burner in which means is provided to effectively vaporize the fuel and whereby the vaporized fuel will be maintained at a high heat and be prevented from condensing until it escapes from the burner and is consumed.

A further object of the invention is to provide a burner in which the minimum deposit of carbon will occur as well as to make it feasible to readily remove the carbon.

An important object of the invention also is to provide a burner in which the flame will be caused to spread over a wide area and in a manner to effectively apply its heat to the burner elements including the vaporizing tube, the burner tube and the connections therebetween.

More specifically, the invention has for an object to embody the same in a construction reflecting practical considerations with regard to simplicity, durability, the effective regulation of the flame, as well as the convenience of installation, and looking to the adaptability of the burner for use with standard heater bodies or any approved design of heater bodies.

The above and other objects as will appear are attained by a burner embodying the novel features and constructional elements hereinafter particularly described and claimed.

Reference is to be had to the accompanying drawings forming a part of this specification, it being understood that the drawings are merely illustrative of one example of the invention.

Figure 1:
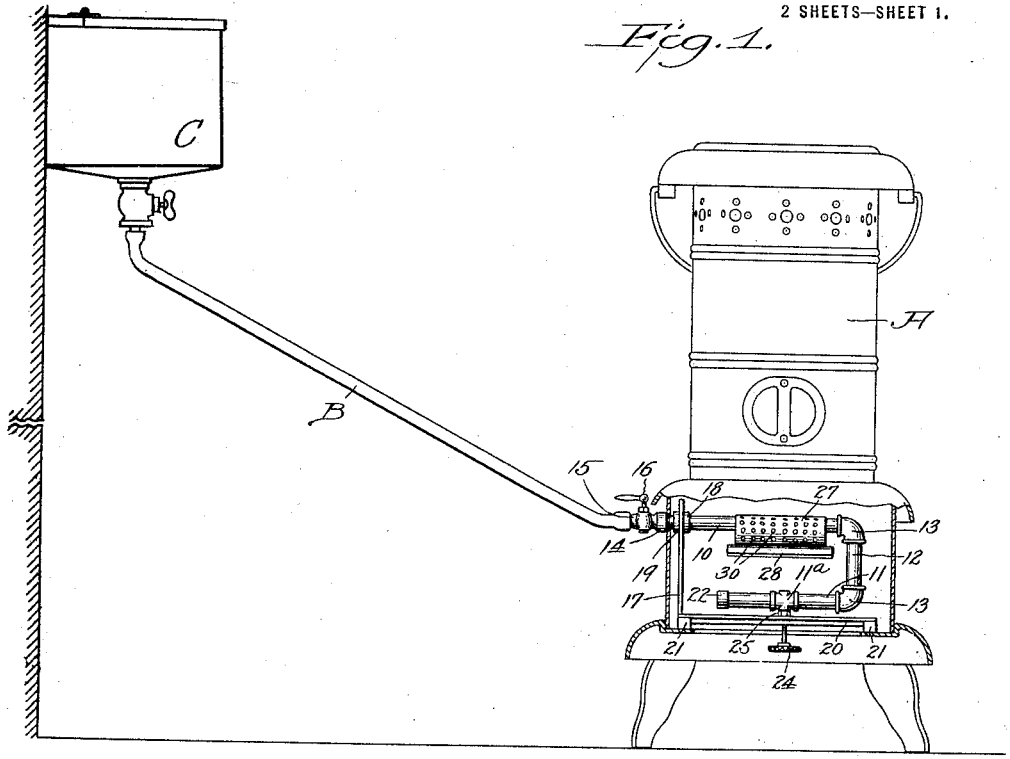
Figure 1 is an elevation of my improved burner showing the same as employed with a heater body shown partly broken away and in section and an elevated oil reservoir connected with the burner to supply liquid fuel thereto.

In carrying out my invention in accordance with the particular example illustrated, the burner includes a vaporizing tube 10 preferably a piece of pipe, horizontally disposed, the burner being here shown as set in a heater body A which generally is of known form, said vaporizing tube being in communication by a tube or other connection B with an elevated reservoir C adapted to contain a supply of liquid fuel. The vaporizing tube 10 is at the top of the burner, and beneath said tube and spaced therefrom is a jet tube 11 formed integral with or otherwise connected with the vaporizing tube 10, there being shown in the present form a vertical pipe member 12 connecting respectively with the tubes 10, 11 by elbows 13. At the inlet end of the tube 10 in the illustrated form is a fitting 14 communicating with said tube and having a nipple 15 or the like to receive the tube B, said fitting having a cock 16 to control the inlet of fuel to the burner. The tube 10 is supported on a broad upstanding member 17 through which said tube passes, there being employed advantageously clamp nuts 18, 19 threaded on said tube at opposite sides of the member 17. The member 17 may be formed of any suitable material and is rigid with an elongated base 20 ranging beneath the jet tube 11 and provided in practice with suitable legs 21 shown as formed on cross strips 21ª secured to the under side of the base 20, said base in practice advantageously being formed partly or wholly of asbestos. Said legs may rest on any suitable supporting part of the heater body or equivalent support provided for the burner. The base 20 preferably is curved in cross section as best seen in Fig. 3 to better adapt it for holding solidified alcohol cubes or like priming material for giving a preliminary heating to the burner and particularly to the jet tube 11 for vaporizing the fuel before lighting the burner.

The terminal of the jet tube 11 is closed by a cap 22 and approximately central of said tube the same is formed with a jet orifice 23 at the top. Preferably, a single jet orifice is employed and I provide means whereby the single jet will result in a flame spreading beneath the vaporizing tube 10 and presenting a wide area as hereinafter explained. The jet orifice 23 is regulated by a vertical needle valve 24, the jet orifice being also advantageously in a separate coupled section 11$^a$, the bottom of which is provided with a packing nut 25 or like stuffing box through which the needle valve 24 extends, said valve passing upwardly through a hole 20$^a$ in base 20 and through the bottom of the heater A or other supporting means.

Within the tube 10, advantageously for nearly its entire length, is removably fitted an insert 26 of fine copper wire mesh, said mesh preferably being coiled in several convolutions to approximately fill said tube. The insert 26 may be removed by uncoupling the elbow 13 or the fitting 14, or both, and the copper deposit on said shell dissolved or loosened by any suitable agent.

Figure 2:
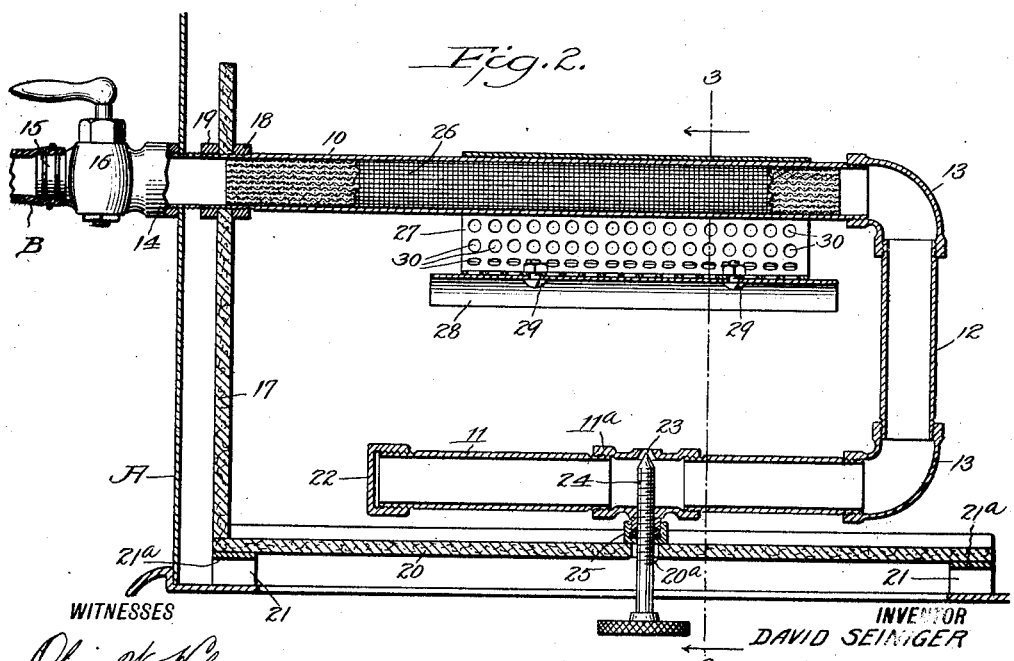
Fig. 2 is a longitudinal vertical section taken through the burner and a portion of the heater body.
Figure 3:
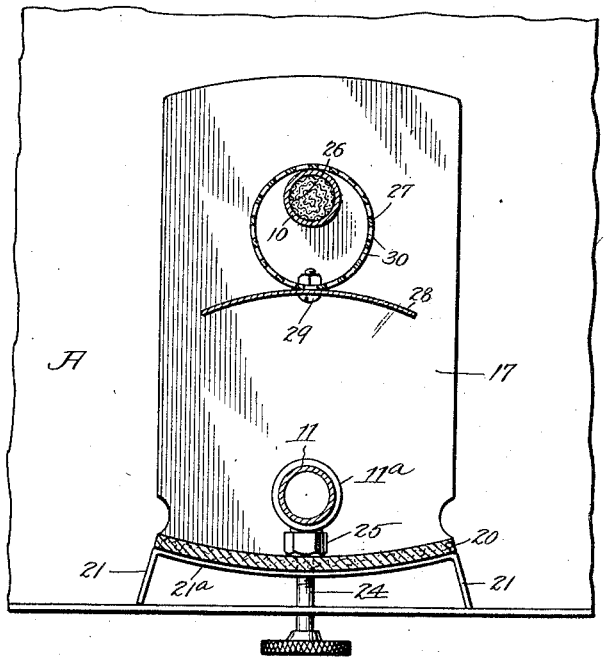
Fig. 3 is a transverse vertical section on the line 3—3, Fig. 2.
Figure 6:
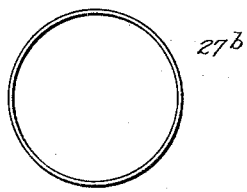
Fig. 6 is an end view of said external attachment in the form shown in Figs. 1 to 3 but with the separate spreader element omitted.

In order to promote combustion of the vaporized fuel issuing from the jet orifice 23 and rising about the vaporizing tube 10, I provide a shell 27 which in the form shown in Figs. 1 to 3 and in Fig. 6 is round or substantially round in cross section and has open ends and said shell is advantageously perforated for the free circulation of vaporized fuel and air in and about the shell so that the flame may have intimate contact with the vaporizing tube 10 and a high heat be maintained directly adjacent to and in the vicinity of said tube. Associated with the shell 27 in the preferred form of my invention is a spreader means. In the form shown in Figs. 1 to 3 a separate spreader plate 28 ranges lengthwise of said shell and is suitably secured thereto preferably by stove bolts 29. The spreader plate preferably extends at its ends beyond the ends of the shell 27 as shown and also extends laterally beyond both sides of the shell. The arrangement can be made to produce a flame as broad as or broader than the spreader plate 28 so as to curl up over the end and side edges thereof, this being possible by the complete vaporization of the fuel produced by my improved burner and by the proper regulation of the unitary jet orifice 23. The result is that not only is the vaporizing tube 10 very highly heated but the heat is maintained about the connections 12, 13, or equivalent connecting means and a material portion of the heat is deflected downwardly against the jet tube 11 so that the fuel is not only quickly vaporized but is maintained in the vaporized condition until it issues from the jet orifice and is consumed.

Figure 4:
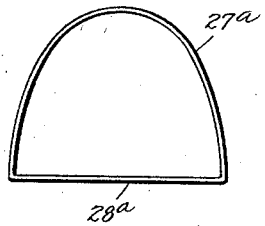
Fig. 4 is an end view of a modified form of the external attachment on the vaporizing pipe for spreading the flame and promoting combustion of the vaporized fuel and the effective application of the heat to said vaporizing pipe as well as to the jet element of the burner and intermediate connections.
Figure 5:
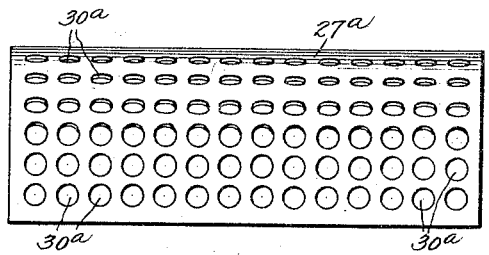
Fig. 5 is a side elevation of the device shown in Fig. 4.

In Figs. 4 and 5 a shell, 27$^a$, is shown to be used in lieu of the shell 27 and in this case instead of employing a separate plate the bottom 28$^a$ of said shell is made flat to spread the flame. In the form shown in Fig. 6 the shell 27$^b$ is shown round in cross section and corresponds in all respects with the shell 27 except that the spreader 28 is omitted.

The vaporizing tube 10 is in practice made of brass because of its comparatively low specific heat, whereby the tube may be raised to a vaporizing heat very quickly. The shell 27 is also preferably made of brass for a similar reason to more effectively produce very quickly a high heat in the air chamber formed by said shell. The copper insert 26 not only serves to effectively atomize the flowing kerosene or the like and expose the same to a large heating surface but the copper promotes catalytic action in producing a gas from a kerosene vapor.

I would state in conclusion that while the illustrated example constitutes a practical embodiment of my invention, I do not limit myself strictly to the mechanical details herein illustrated, since manifestly the same can be considerably varied without departure from the spirit of the invention as defined in the appended claims.

Having thus described my invention, I claim:

1. A burner of the class described, including a vaporizing element affording a passage for the flow of the fuel and adapted to be connected with a source of fuel supply, a tubular element external of the first element and forming a space between said elements, said external element being perforated, and a jet element beneath said vaporizing element and in communication therewith to receive fuel therefrom, said tubular external element having transversely disposed spreader means rigid therewith at the under side, said jet element being adapted to direct a jet against the underside of said spreader means.

2. A burner of the class described including a vaporizing element affording a passage for the flow of fuel and adapted to be connected with a source of fuel supply, a perforated shell on said element and spaced therefrom at the bottom and sides forming an air chamber, a spreader at the under side of said shell, and a jet element beneath said spreader and adapted to direct a jet against the under side thereof, said jet element being in communication with the vaporizing element to receive fuel therefrom.

DAVID SEINIGER.